United States Patent [19]

Umeda et al.

[11] Patent Number: 5,637,643
[45] Date of Patent: Jun. 10, 1997

[54] POLYCARBONATE RESIN COMPOSITION AND EXTERIOR AUTOMOTIVE TRIM USING SAME

[75] Inventors: Takashi Umeda; Teruhiko Nakazato, both of Ichihara, Japan

[73] Assignee: Idemitsu Petrochemical Co., Ltd., Tokyo, Japan

[21] Appl. No.: 546,894

[22] Filed: Oct. 23, 1995

[30] Foreign Application Priority Data

Oct. 31, 1994 [JP] Japan ................... 6-266498

[51] Int. Cl.$^6$ ................................ C08G 64/00
[52] U.S. Cl. .................. 524/537; 264/176.1; 524/588; 524/611; 525/67; 525/146; 525/148; 525/464; 528/196; 528/199
[58] Field of Search .............. 264/176.1; 525/67, 525/146, 148, 147, 464; 528/29, 196, 199, 176; 524/537, 588, 611

[56] References Cited

U.S. PATENT DOCUMENTS

| 4,161,469 | 7/1979 | Legrand et al. | 525/439 |
| 5,273,685 | 12/1993 | Takata et al. | 252/511 |

FOREIGN PATENT DOCUMENTS

| 0 135 904 | 4/1985 | European Pat. Off. |
| 193 060 | 9/1986 | European Pat. Off. |
| 2343778 | 10/1977 | France |
| WO82/02398 | 7/1982 | WIPO |

OTHER PUBLICATIONS

Database WPI, Derwent Publications, AN 93–309315, and Patent Abstracts of Japan, C1140, JP–05–222–283, Aug. 31, 1993.

*Primary Examiner*—Terressa Mosley
*Attorney, Agent, or Firm*—Oblon, Spivak, McClelland, Maier & Neustadt, P.C.

[57] ABSTRACT

The present invention intends to provide a polycarbonate resin composition which can inhibit the deterioration of the resin, can stably afford molded articles having a high stiffness and a good appearance, and is desirable as a material of exterior automotive trims and the like.

The polycarbonate resin composition which comprises 30 to 89% by weight of a polycarbonate resin (A), 10 to 50% by weight of an aromatic polyester resin (B), 0 to 50% by weight of a rubbery elastomer (C) and 1 to 30% by weight of a surface-treated talc, mica or a mixture thereof (D). If necessary, a phosphite antioxidant (E) is blended with a mixture of these components (A), (B), (C) and (D) in an amount of 0.01 to 5 parts by weight to 100 parts by weight of the mixture. The exterior automotive trims can be obtained by molding this polycarbonate resin composition.

12 Claims, No Drawings

POLYCARBONATE RESIN COMPOSITION AND EXTERIOR AUTOMOTIVE TRIM USING SAME

BACKGROUND OF THE INVENTION

1. Field of the Invention

The present invention relates to a polycarbonate resin composition and exterior automotive trims using the same. More specifically, it relates to a polycarbonate resin composition which can inhibit the deterioration of the resin, can stably provide molded articles having a high stiffness and a good appearance, and is desirable as a material of exterior automotive trims or the like, and exterior automotive trims obtained by molding the polycarbonate resin composition.

2. Description of the Related Art

Heretofore, polycarbonate resins have been widely used as engineering plastics in various fields such as automobiles, electric.electronic machinery and office automation machinery, because of being excellent in mechanical properties such as impact strength and strength, electrical properties, transparency and the like. In the case that the polycarbonate resins are used as materials of interior and exterior automotive trims, they have been blended with a polyester resin or a rubbery elastomer to improve solvent resistance and impact resistance.

Recently, in the fields of the automobiles and the like, fine inorganic fillers of talc, mica, potassium titanate whisker and the like have been blended in order to improve stiffness and long-term practical characteristics without impairing appearance. However, these inorganic fillers are usually alkaline, and so they accelerate the hydrolysis of the polycarbonate resin or the polyester resin to decrease its molecular weight, which leads to unpreferable results. For example, the strength of molded articles decreases, and surface roughening and yellowing occur to impair the appearance. Thus, in order to inhibit the deterioration of the resin, it has been tried to blend a phosphite compound (Japanese Patent Application Laid-open No. 222283/1993), but its effect is not always sufficiently satisfactory.

SUMMARY OF THE INVENTION

Under such circumstances, the present invention has been intended, and an object of the present invention is to provide a polycarbonate resin composition which can inhibit the deterioration of the resin, can stably afford molded articles having a high stiffness, impact resistance and working properties and a good appearance, and is desirable as a material of exterior automotive trims and the like.

The present inventors have intensively researched to develop a polycarbonate resin composition having the above-mentioned preferable characteristics, and as a result, it has been found that the above-mentioned object can be achieved by blending a resin composition comprising a polycarbonate resin, an aromatic polyester resin and if necessary, a rubbery elastomer in a predetermined ratio with a surface-treated talc or mica in a predetermined ratio and if necessary, a phosphite antioxidant in a predetermined ratio. In consequence, the present invention has been completed on the basis of such a knowledge.

That is to say, the present invention is directed to a polycarbonate resin composition which comprises 30 to 89% by weight of a polycarbonate resin (A), 10 to 50% by weight of an aromatic polyester resin (B), 0 to 50% by weight of a rubbery elastomer (C) and 1 to 30% by weight of a surface-treated talc, mica or a mixture thereof (D); and a polycarbonate resin composition obtained by blending 100 parts by weight of a mixture of 30 to 89% by weight of the component (A), 10 to 50% by weight of the component (B), 0 to 50% by weight of the component (C) and 1 to 30% by weight of the component (D) with 0.01 to 5 parts by weight of a phosphite antioxidant (E).

Furthermore, the present invention is also directed to exterior automotive trims obtained by molding the above-mentioned polycarbonate resin composition.

As the polycarbonate resin which is the component (A) constituting the resin composition of the present invention, various resins are usable, and an example of the preferable polycarbonate resin is a polymer containing a structural unit represented by the general formula (I)

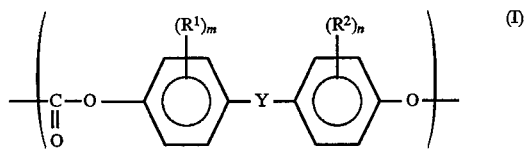

wherein $R^1$ and $R^2$ are each a hydrogen atom, a halogen atom (chlorine, bromine, fluorine or iodine) or an alkyl group having 1 to 8 carbon atoms (e.g., a methyl group, an ethyl group, an n-propyl group, an isopropyl group, an n-butyl group, an isobutyl group, an amyl group, an isoamyl group or a hexyl group), $R^1$ and $R^2$ may be the same or different from each other, and if a plurality of $R^1$s are present, they may be the same or different, and if a plurality of $R^2$s are present, they may be the same or different; m and n are each an integer of 1 to 4; and Y is a single bond, an alkylene group having 1 to 8 carbon atoms, an alkylidene group having 2 to 8 carbon atoms (e.g., a methylene group, an ethylene group, a propylene group, a butylene group, a pentylene group, a hexylene group, an ethylidene group or an isopropylidene group), a cycloalkylene group having 5 to 15 carbon atoms, a cycloalkylidene group having 5 to 15 carbon atoms (e.g., a cyclopentylene group, a cyclohexylene group, a cyclopentylidene group or a cyclohexylidene group), —S—, —SO—, —SO$_2$—, —O—, —CO— or a bond represented by the formula (II) or (II'):

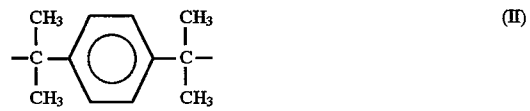

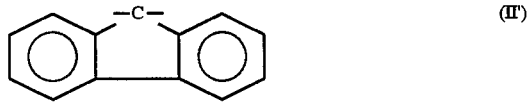

This polycarbonate resin can easily be prepared by the reaction of phosgene or a carbonic acid diester compound with a dihydric phenol represented by the general formula (III)

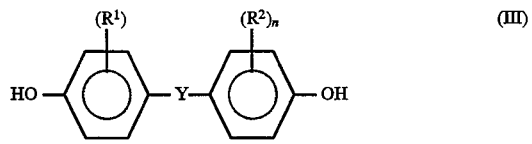

wherein $R^1$, $R^2$, Y, m and n are the same as described above.

For example, the polycarbonate resin can be prepared by the reaction the dihydric phenol with a carbonate precursor such as phosgene in a solvent such as methylene chloride in the presence of a known acid acceptor or a molecular weight modifier, or by transesterification between the dihydric phenol and a carbonate precursor such as diphenyl carbonate.

As the dihydric phenols represented by the general formula (III), various phenols are included, and 2,2-bis(4-hydroxyphenyl)propane (usually called bisphenol A) is particularly preferable. In addition to bisphenol A, examples of the dihydric phenol include dihydroxydiarylalkanes such as bis(4-hydroxyphenyl)methane, bis(4-hydroxyphenyl)phenylmethane, bis(4-hydroxyphenyl)naphthylmethane, bis(4-hydroxyphenyl)(4-isopropylphenyl)methane, bis(3,5-dichloro-4-hydroxyphenyl)methane, bis(3,5-dimethyl-4-hydroxyphenyl)methane, 1,1-bis(4-hydroxyphenyl)ethane, 1-naphthyl-1,1-bis(4-hydroxyphenyl)ethane, 1-phenyl-1,1bis-(4-hydroxyphenyl)ethane, 1,2-bis(4-hydroxyphenyl)ethane, 2-methyl-1,1-bis(4-hydroxyphenyl)propane, 2,2-bis(3,5-dimethyl-4-hydroxyphenyl)propane, 1-ethyl-1,1-bis(4-hydroxyphenyl)propane, 2,2-bis(3,5-dichloro-4-hydroxyphenyl)propane, 2,2-bis(3,5-dibromo-4-hydroxyphenyl)propane, 2,2-bis(3-chloro-4-hydroxyphenyl)propane, 2,2-bis(3-methyl-4-hydroxyphenyl)propane, 2,2-bis(3-fluoro-4-hydroxyphenyl)propane, 1,1-bis(4-hydroxyphenyl)butane, 2,2-bis(4-hydroxyphenyl)butane, 1,4-bis(4-hydroxyphenyl)butane, 2,2-bis(4-hydroxyphenyl)pentane, 4-methyl-2,2-bis(4-hydroxyphenyl)pentane, 2,2-bis(4-hydroxyphenyl)hexane, 4,4-bis(4-hydroxyphenyl)heptane, 2,2-bis(4-hydroxyphenyl)nonane, 1,10-bis(4-hydroxyphenyl)decane, 1,1-bis(4-hydroxyphenyl)-3,3,5-trimethylcyclohexane and 2,2-bis(4-hydroxyphenyl)-1,1,1,3,3,3-hexafluoropropane; dihydroxydiarylcycloalkanes such as 1,1-bis(4-hydroxyphenyl)cyclohexane, 1,1-bis(3,5-dichloro-4-hydroxyphenyl)cyclohexane and 1,1-bis(4-hydroxyphenyl)cyclodecane; dihydroxydiaryl sulfones such as bis(4-hydroxyphenyl)sulfone, bis(3,5-dimethyl-4-hydroxyphenyl) sulfone and bis(3-chloro-4-hydroxyphenyl)sulfone; dihydroxydiaryl ethers such as bis(4-hydroxyphenyl) ether and bis(3,5-dimethyl-4-hydroxyphenyl) ether; dihydroxydiaryl ketones such as 4,4'-dihydroxybenzophenone and 3,3', 5,5'-tetramethyl-4,4'-dihydroxybenzophenone; dihydroxydiaryl sulfides such as bis(4-hydroxyphenyl) sulfide, bis(3-methyl-4-hydroxyphenyl) sulfide and bis(3,5-dimethyl-4-hydroxyphenyl) sulfide; dihydroxydiaryl sulfoxides such as bis(4-hydroxyphenyl) sulfoxide, dihydroxydiphenyls such as 4,4'-dihydroxydiphenyl, and dihydroxyarylfluorenes such as 9,9-bis(4-hydroxyphenyl)fluorene. In addition to the dihydric phenols represented by the general formula (III), examples of the usable dihydric phenol include dihydroxybenzenes such as hydroquinone, resorcinol and methylhydroquinone; and dihydroxynaphthalenes such as 1,5-dihydroxynaphthalene and 2,6-dihydroxynaphthalene. These dihydric phenols can be used singly or in a combination of two or more thereof.

Furthermore, examples of the carbonic acid diester compound include diaryl carbonates such as diphenyl carbonate, and dialkyl carbonates such as dimethyl carbonate and diethyl carbonate.

As the molecular weight modifier, various modifiers, which have usually been used in the polymerization of polycarbonates, can be used in the present invention. Typical examples of the molecular weight modifier include monohydric phenols such as phenol, p-cresol, p-tert-butylphenol, p-tert-octylphenol, p-cumylphenol, bromophenol, tribromophenol and nonylphenol.

In a certain case, there may be used, as the polycarbonate resin which is the component (A), a polycarbonate-polyorganosiloxane copolymer comprising a polycarbonate moiety having a repeating unit represented by the above-mentioned general formula (I)

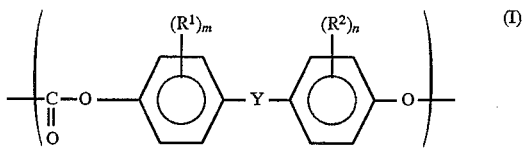

wherein $R^1$, $R^2$, Y, m and n are the same as described above and a polyorganosiloxane moiety having a repeating unit represented by the general formula (IV)

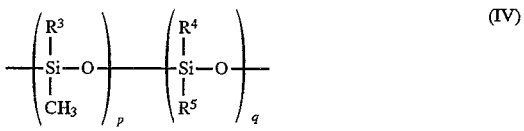

wherein $R^3$, $R^4$ and $R^5$ are each a hydrogen atom, an alkyl group having 1 to 6 carbon atoms (e.g., a methyl group, an ethyl group, a propyl group, an n-butyl group, an isobutyl group, an amyl group, an isoamyl group or a hexyl group) or a phenyl group, and $R^3$, $R^4$ and $R^5$ may be the same or different; and p and q are each an integer of 0 or 1 or more, provided that both of p and q are not simultaneously 0.

The polymerization degree of this polyorganosiloxane moiety is preferably 5 or more.

In the present invention, the polycarbonate resin which is the component (A) can contain a branched polycarbonate, if necessary.

In order to obtain the branched polycarbonate, a branching agent is used, and examples of the branching agent include phloroglucin, mellitic acid, trimellitic acid, trimellitic acid chloride, trimellitic anhydride, gallic acid, n-propyl gallate, protocatechuic acid, pyromellitic acid, pyromellitic dianhydride, α-resorcylic acid, β-resorcylic acid, resorcylaldehyde, trimethyl chloride, isatin bis(o-cresol), trimethyl trichloride, 4-chloroformylphthalic anhydride, benzophenonetetracarboxylic acid, 2,4,4'-trihydroxybenzophenone, 2,2',4,4'-tetrahydroxybenzophenone, 2,4,4'-trihydroxyphenyl ether, 2,2',4,4'-tetrahydroxyphenyl ether, 2,4,4'-trihydroxydiphenyl-2-propane, 2,2'-bis(2,4-dihydroxy)propane, 2,2',4,4'-tetrahydroxydiphenylmethane, 2,4,4'-trihydroxydiphenylmethane, 1-[α-methyl-α-(4'-dihydroxyphenyl)ethyl]-3-[α',α'-bis(4''-hydroxyphenyl)ethyl]benzene, 1-[α-methyl-α-(4'-dihydroxyphenyl)ethyl]-4-[α',α'-bis(4''-hydroxyphenyl)ethyl]benzene, α',α',α''-tris(4-hydroxyphenyl)-1,3,5-triisopropylbenzene, 2,6-bis(2-hydroxy-5'-methylbenzyl)-4-methylphenol, 4,6-dimethyl-2,4,6-tris(4'-hdyroxyphenyl)-2-heptene, 4,6-dimethyl-2,4,6-tris(4'-hydroxyphenyl)-2-heptane, 1,3,5-tris(4'-hydroxyphenyl)benzene, 1,1,1-tris(4-hydroxyphenyl)ethane, 2,2-bis[4,4-bis(4'-hydroxyphenyl)cyclohexyl]propane, 2,6-bis(2'-hydroxy-5'-isopropylbenzyl)-4-isopropylphenol, bis[2-hydroxy-3-(2'-hydroxy-5'-methylbenzyl)-5-methylphenyl]methane, bis[2-hydroxy-3-(2'-hydroxy-5'-isopropylbenzyl)-5-methylphenyl]methane, tetrakis(4-hydroxyphenyl)methane, tris(4-hydroxyphenyl)phenylmethane, 2',4',7-trihydroxyflavan, 2,4,4-trimethyl-2',4',7-trihydroxyflavan, 1,3-bis(2',4'-dihydroxyphenylisopropyl)benzene and tris(4'-hydroxyphenyl)amyl-s-triazine.

In addition to the above-mentioned compounds, as the polycarbonate resin which is the component (A), there can also be used copolymers obtained from comonomers, i.e., aliphatic straight-chain divalent carboxylic acids such as adipic acid, pimelic acid, suberic acid, azelaic acid, sebacic acid or decanedicarboxylic acid.

In the present invention, these polycarbonate resins mentioned above as the component (A) may be used singly or in a combination of two or more thereof. From the viewpoint of mechanical strength and moldability, the polycarbonate resin preferably has a viscosity-average molecular weight of 10,000 to 100,000, particularly preferably 15,000 to 40,000.

Next, as the aromatic polyester resin which is the component (B), various compounds can be used in the present invention. For example, polyester resins obtained by polymerizing bifunctional carboxylic acids and alkylene glycols are suitable.

Here, examples of the bifunctional carboxylic acids include aromatic dicarboxylic acids such as terephthalic acid, isoterephthalic acid and naphthalenedicarboxylic acid. Above all, terephthalic acid is preferable, and another bifunctional carboxylic acid can also be used, so far as the effect of the present invention is not impaired. Examples of the other bifunctional carboxylic acid include aliphatic dicarboxylic acids such as oxalic acid, malonic acid, adipic acid, suberic acid, azelaic acid, sebacic acid and decanedicarboxylic acid as well as derivatives capable of forming esters thereof. A blend ratio of each of these other dicarboxylic acids is preferably 20 mol % or less based on the total dicarboxylic acids.

Next, no particular restriction is put on the kind of alkylene glycol, and examples of the usable alkylene glycol include aliphatic diols having 2 to 15 carbon atoms such as ethylene glycol, propylene-1,2-glycol, propylene-1,3-glycol, butylene-1,4-glycol, butylene-2,3-glycol, hexane-1,6-diol, octane-1,8-diol, neopentyl glycol and decane-1,10-diol as well as polyethylene glycols. These alkylene glycols may be used singly or in a combination of two or more thereof.

As the polyester resins obtained by polymerizing the bifunctional carboxylic acids and the alkylene glycols, polyethylene terephthalate and polybutylene terephthalate are particularly suitable.

The aromatic polyester resin which is the component (B) can be prepared in a usual manner in the presence or absence of a polycondensation catalyst containing titanium, germanium or antimony. For example, polyethylene terephthalate can usually be prepared by a first step of carrying out an esterification reaction between terephthalic acid and ethylene glycol, or carrying out an ester exchange reaction between a lower alkyl ester of terephthalic acid such as dimethyl terephthalate and ethylene glycol to prepare a glycol ester of terephthalic acid and/or its low polymer, and then a second step, i.e., the so-called polymerization reaction of further polymerizing the glycol ester and/or its low polymer to obtain a polymer having a high polymerization degree.

The aromatic polyester resins which can be used as the component (B) may be used singly or in a combination of two or more thereof.

Furthermore, as the rubbery elastomer which is the component (C), various compounds can be used. Suitable examples of the elastomer are copolymers obtained by polymerizing one or more kinds of vinyl monomers in the presence of rubbery polymers.

Here, examples of the rubbery elastomer include copolymers of one or more of an acrylic polymer or a methacrylic polymer mainly comprising an alkyl acrylate or an alkyl methacrylate, a diene polymer mainly comprising a conjugated diene such as butadiene or isoprene, and a silicone polymer mainly comprising a polyorganosiloxane, and these copolymers are usually called MAS resins, MBS resins and MABS resins.

Examples of the vinyl monomer include aromatic vinyl compounds such as styrene and α-methylstyrene, acrylic esters such as methyl acrylate and ethyl acrylate, methacrylic esters such as methyl methacrylate and ethyl methacrylate, and vinyl cyanide compounds such as acrylonitrile.

As the rubbery elastomer, there can be used known elastomers disclosed in, for example, Japanese Patent Publication Nos. 29308/1973 (the MAS resin) and 9435/1980 (the MBS resin) as well as Japanese Patent Application Laid-open Nos. 6051/1989 (the MAIS resin) and 79257/1989.

These rubbery elastomers are on the market under the trade names of, for example, Paraloid KM330 (made by Rohm & Haas Co., the MAS resin), Metablen C-223 (made by Mitsubishi Rayon Co., Ltd., the MBS resin), and Metablen S-2001 (made by Mitsubishi Rayon Co., Ltd., the MAS resin).

In addition to the above-mentioned rubbery elastomers, usable other examples include butadiene rubber (BR), styrene-butadiene rubber (SBR), isobutylene-isoprene rubber (IIR), ethylene-propylene rubber (EPR), ethylene-propylenediene rubber (EPDM), acrylonitrile-butadiene rubber (NBR), styrene-butadiene-styrene rubber (SBS), a hydride of styrene-butadiene rubber (SEBS), styrene-isoprene-styrene rubber (SIS) and a hydride of styrene-isoprene rubber (SEPS).

These rubbery elastomers which can be used as the component (C) may be used singly or in a combination of two or more thereof.

In the resin composition of the present invention, a surface-treated talc and/or a surface-treated mica is used as the component (D). Here, the average particle diameter of the talc is in the range of 0.2 to 10 μm, preferably 0.2 to 5 μm, and that of mica is in the range of 1 to 30 μm, preferably 2 to 30 μm.

No particular restriction is put on a preparation method of the talc or mica, and for example, it can be prepared by the following procedure. That is to say, a raw ore of the talc or mica is ground by a device such as a tube mill type grinder, an impact grinder, a micron mill type grinder or a centrifugal roller type Raymond mill. When fine grinding is required, the thus ground ore is further subjected to dry or wet fine grinding by the use of a micron mill, a jet mill, a Jet-O-Mizer, a micronizer, a jet pulverizer, an agitational grinding mill (a tower mill), a vibratory mill, a colloid mill or te like.

Next, the thus ground talc or mica is subjected to dry or wet classification repeatedly once or plural times to regulate its physical properties by the use of a cyclone separator, a multiclone, a micron separator, a microplex, a cyclone air-separator, an ultra-separator, a jetclone, a classiclone, a rake classifier, a hydrocyclone, a hydroulic classifier, a centrifugal classifier or the like.

In the present invention, it is necessary that the talc or mica should be subjected to a surface treatment by the use of a surface treatment agent and then used in order to inhibit the deterioration of the resin preferable examples of the surface treatment agent include various coupling agents, reactive silicone compounds and acidic compounds.

Here, examples of the coupling agents include silane-based, titanate-based, aluminum-based, chromium-based zirconium-based and borane-based coupling agents, and above all, the silane-based coupling agent and the titanate-based coupling agent are preferable, and especially the silane-based coupling agent is preferable.

Typical examples of the silane-based coupling agent include triethoxysilane, vinyltris(β-methoxy)silane, γ-methacryloxypropyltrimethoxysilane, γ-glycidoxypropyltrimethoxysilane, β-(3,4-epoxycyclohexyl)ethyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane and γ-chloropropyltrimethoxysilane. In particular, when polyethylene terephthalate is used as the component (B), it is preferable to use the talc or mica subjected to the surface treatment by the aminosilane coupling agent, or when polybutylene terephthalate is used as the component (B), it is preferable to use the talc or mica subjected to the surface treatment by the epoxysilane coupling agent.

Moreover, examples of the reactive silicone compounds include compounds having reactive groups such as an alkoxy group, an epoxy group, a vinyl group, an amino group, a carboxyl group and a mercapto group, and silicone compounds having the alkoxy group, the epoxy group and the carboxyl group which can easily react with an active hydroxyl group of the talc or mica are preferable.

Furthermore, examples of the acidic compounds include acids such as hydrochloric acid, sulfuric acid, nitric acid and phosphoric acid as well as aluminum chloride and aluminum sulfate which are salts of the above-mentioned acids. When the treatment is carried out by the use of any of these acidic compounds, the system which is alkaline can come up to a neutral system.

No particular restriction is put on the method of the treatment using the surface treatment agent, and a conventional usual method, for example, an aqueous solution method, an organic solvent method or a spray method can be utilized. The surface treatment agent can usually be used in an amount of 0.1 to 10% by weight based on the weight of the talc or mica. If the amount of the talc or mica is less than 0.1% by weight, the effect of inhibiting the deterioration of the resin cannot sufficiently be exerted, and if it is more than 10% by weight, the effect cannot correspondingly be increased and what is worse, the feed of the talc or mica at the time of kneading is unstable.

The resin composition of the present invention is required to comprise 30 to 89% by weight of the polycarbonate resin as the component (A), 10 to 50% by weight of the aromatic polyester resin as the component (B), 0 to 50% by weight of the rubbery elastomer as the component (C) and 1 to 30% by weight of the surface-treated talc and/or the surface-treated mica as the component (D) based on the total weight of the components (A), (B), (C) and (D). If the content of the component (A) is less than 30% by weight, the inherent characteristics of the polycarbonate resin are lost, and if it is more than 89% by weight, the contents of the other components relatively decrease, so that the composition having desired physical properties cannot be obtained any more. If the content of the component (B) is less than 10% by weight, the improvement effect of solvent resistance cannot sufficiently be exerted, and if it is more than 50% by weight, the inherent characteristics of the polycarbonate resin cannot sufficiently be exerted. Furthermore, if the content of the component (C) is more than 50% by weight, the inherent characteristics of the polycarbonate resin cannot sufficiently be exerted. In addition, if the content of the component (D) is less than 1% by weight, the improvement effect of stiffness cannot sufficiently be exerted, and if it is more than 30% by weight, the specific gravity of the composition increases, so that impact resistance and appearance tend to deteriorate. From the viewpoints of the inherent characteristics of the polycarbonate resin, solvent resistance, stiffness, impact resistance and appearance, the resin composition of the present invention preferably comprises 50 to 85% by weight of the component (A), 15 to 40% by weight of the component (B), 0 to 30% by weight of the component (C) and 1 to 20% by weight of the component (D), and particularly preferably, it comprises 55 to 80% by weight of the component (A), 15 to 35% by weight of the component (B), 1 to 20% by weight of the component (C) and 1 to 15% by weight of the component (D).

In the resin composition of the present invention, a phosphite-containing antioxidant can be used as a component (E), when desired. As this phosphite-containing antioxidant, various compounds are usable. Examples of the phosphite-containing antioxidant include compounds represented by the formula (V)

wherein $R^6$ is a hydrogen atom, an alkyl group having 1 to 20 carbon atoms, an aryl group having 6 to 20 carbon atoms, an alkylaryl group having 7 to 30 carbon atoms or an arylalkyl group having 7 to 30 carbon atoms, and this hydrocarbon group may be substituted by a halogen atom, an alkylthio group having 1 to 30 carbon atoms or a hydroxyl group, and the three $R^6$s may be the same or different from each other, provided that they are not simultaneously the hydrogen atoms, and compounds represented by the formula (VI)

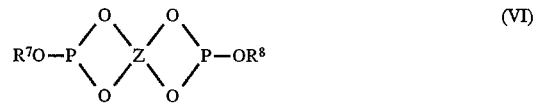

wherein $R^7$ and $R^8$ are each a hydrogen atom, an alkyl group having 1 to 20 carbon atoms, an aryl group having 6 to 20 carbon atoms, an alkylaryl group having 7 to 20 carbon atoms, or an arylalkyl group having 7 to 20 carbon atoms, and this hydrocarbon group may be substituted by a halogen atom, an alkylthio group having 1 to 30 carbon atoms or a hydroxyl group, and $R^7$ and $R^8$ are may be the same or different from each other, provided that they are not simultaneously the hydrogen atoms; and Z is a tetravalent hydrocarbon residue having 1 to 20 carbon atoms which may contain an ether linkage.

Of the phosphite compounds represented by the general formula (VI), a pentaerythritol type phosphite compound in which Z is represented by the formula

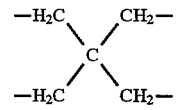

is preferable.

Examples of the phosphite compounds represented by the general formula (V) include tris(mixed mono- and di-nonylphenyl) phosphite, trisnonylphenyl phosphite, tris (2,4-di-t-butylphenyl) phosphite, priphenyl phosphite and diphenylmono-(2-ethylhexyl) phosphite, and examples of the phosphite compounds represented by the general formula (VI) include bis(2,4-di-t-butylphenyl)pentaerythritol diphosphite, bis(2,6-di-t-butyl-4-methylphenyl) pentaerythritol diphosphite and distearylpentaerythritol diphosphite. These phosphite compounds can be used singly or in a combination of two or more thereof.

In the resin composition of the present invention, the phosphite-containing antioxidant which is the component (E) is blended in an amount of 0.01 to 5 parts by weight based on 100 parts by weight of the mixture comprising the components (A), (B), (C) and (D). If the amount of the antioxidant to be blended is less than 0.01 part by weight, the effect of inhibiting the deterioration of the resin cannot sufficiently be exerted, and if it is more than 5 parts by weight, the effect cannot correspondingly be increased, which is economically disadvantage. From the viewpoints of the inhibition effect of the resin deterioration and economy, the amount of the phosphite-containing antioxidant to be blended is preferably in the range of 0.05 to 4 parts by weight, more preferably 0.1 to 2 parts by weight.

In addition to the above-mentioned components (A), (B), (C), (D) and (E), various additives can be added to the resin composition of the present invention, if necessary, so far as the object of the present invention is not impaired. Examples of the additives include another synthetic resin, a hindered phenol-based or an amine-based antioxidant, a benzotriazole-based or a benzophenone-based ultraviolet light absorber, a hindered amine-based light stabilizer, an aliphatic carboxylate-based or a paraffin-based silicone oil, an internal lubricant such as polyethylene wax, a flame retardant, a flame retardant auxiliary, an antistatic agent, another inorganic or organic filler, a releasing agent and a colorant.

The resin composition of the present invention can be prepared by blending and then kneading the above-mentioned components (A), (B), (C), (D) and if necessary, the component (E) and the various additives.

The blending and kneading can be carried out by the use of any of conventional usual manners, for example, a manner using a ribbon blender, a Henschel mixer, a Banbury mixer, a drum tumbler, a single-screw extruder, a twin-screw extruder, a cokneader, a multi-screw extruder or the like. The temperature at which the materials are heated during the kneading is usually selected in the range of 240° to 300° C.

The thus obtained polycarbonate resin composition can be molded by any of various known molding methods such as injection molding, blow molding, extrusion molding, compression molding, calender molding and rotation molding to provide various kinds of molded articles such as exterior automotive trims.

The present invention also intends to provide exterior automotive trims which can be manufactured by molding the above-mentioned polycarbonate resin composition. Examples of the exterior automotive trims include door handles, side garnishs, center panels, rear finishers, bumpers and rear panels.

A polycarbonate resin composition of the present invention can inhibit the deterioration of the resin, can stably provide molded articles having a high stiffness and a good appearance, and can be suitably used as a material of exterior automotive trims such as door handles, side garnishs, center panels, rear finishers, bumpers and rear panels.

Next, the present invention will be described in more detail with reference to examples, but the scope of the present invention should not be limited to these examples at all.

Components which will be used in the examples are as follows.

(A) PC resin: Polycarbonate (Toughion A3000, made by Idemitsu Petrochemical Co., Ltd., viscosity-average molecular weight=29,000)

(B) Aromatic polyester resin

B-1: Polyethylene terephthalate resin (Dianight MA-523V, made by Mitsubish Rayon Co., Ltd.)

B-2: Polybutylene terephthalate resin (Toughpet N1000, made by Mitsubish Rayon Co., Ltd.)

(C) Rubbery elastomer

C-1: Hiblen B611 (made by Nippon Zeon Co., Ltd., MAIS resin)

C-2: Metablen S-2001 (Mitsubish Rayon Co., Ltd., MAS resin)

(D) Talc or mica

D-1: Talc subjected to a surface treatment with an aminosilane coupling agent (average particle diameter=0.8 µm, throughput=1 wt %)

D-2: Talc subjected to a surface treatment with an epoxysilane coupling agent (average particle diameter=0.8 µm, throughput=1 wt %)

D-3: Talc subjected to a surface treatment with a methoxy group-containing silicone compound (made by Toray-Dowcorning Silicone Co., Ltd.) (average particle diameter= 0.8 µm, throughput=1 wt %)

D-4: Talc subjected to a surface treatment with hydrochloric acid (average particle diameter=0.8 µm, throughput=1 wt %)

D-5: FFR (talc, made by Asada Flour Milling Co., Ltd., average particle diameter=0.8 µm) (No surface treatment)

D-6: Mica subjected to a surface treatment with an aminosilane coupling agent (M-325CT, made by Repco Co., Ltd., average particle diameter=18 µm, throughput=1 wt %)

(E) Phosphite-containing antioxidant: Bis(2,6-di-t-butyl-4-methylphenyl)pentaerythritol diphosphite (F) Phosphite-containing antioxidant: Diphenyl-mono(2-ethylhexyl) phosphite (G) Aminosilane coupling agent Example 1

A polycarbonate resin and a polyethylene terephthalate resin were dried at 120° C. for 6 hours, and components were then dry-blended with these resins in accordance with a blend composition shown in Table 1. Afterward, the blend was molten, kneaded and then pelletized at a cylinder temperature of 280° C. by a twin-screw vented extruder. The obtained pellets were molded at a cylinder temperature of ° C. to prepare test pieces, and for these test pieces, tensile elongation at break (JIS K-7113), flexural modulus (JIS K-7203) and Izod impact strength (JIS K-7110, 23° C., notched) were measured. Furthermore, for the pellets, a flow value (JIS K-7210, load=160 kg, cylinder temperature=280° C.) was measured.

Next, the working stability of the pellets was evaluated by the following procedure. That is to say, the obtained pellets were allowed to stand in a capillary rheometer at 300° C. for 20 minutes, and during this interval, a strand was sampled every 2 minutes and its appearance was then visually observed. The evaluation was made in accordance with the following ranking, and loads (viscosities) at initiation and after 20 minutes were also measured in order to inspect the change of the loads (the viscosities).

Ranking of appearance judgment o: Neither yellowing nor surface roughening was observed.

◯: The yellowing and surface roughening were slightly observed.

X: The yellowing and surface roughening were noticeably observed.

The results are shown in Table 2.

Examples 2 to 14 and
Comparative Examples 1 to 3

Pellets were obtained by the same procedure as in Example 1 in accordance with a blend composition shown in Table 1, and test pieces were prepared and their physical properties were then measured. The results are shown in Table 2.

Examples 15 and 16, and Comparative Examples 4 and 5

As an aromatic polyester resin, a polybutylene terephthalate resin was used, and components were kneaded in accordance with each blend composition shown in Table 1, and then the same procedure as in Example 1 was carried out at a molding temperature of 260° C. to obtain pellets. Afterward, test pieces were prepared, and physical properties were then measured. In the evaluation of working stability, a test temperature in a capillary rheometer was set to 280° C. The results are shown in Table 2.

It is apparent that when a talc subjected to a surface treatment (aminosilane) is used in a polyethylene terephthalate system, the deterioration of the resin can be inhibited and thermal stability can be improved.

Furthermore, it is apparent that when a talc subjected to a surface treatment (epoxysilane) is used in a polybutylene terephthalate system, tensile elongation at break can be improved.

TABLE 1

| | Blend Composition (parts by weight) | | | | | | | |
|---|---|---|---|---|---|---|---|---|
| | (A) PC Resin | (B) Aromatic Polyester Resin | | (C) Rubbery Elastomer | | (D) Talc or Mica | | (E) Phsphite Antioxidant |
| Ex. or Comp. Ex. | Amount | Kind | Amount | Kind | Amount | Kind | Amount | Amount |
| Ex. 1 | 65 | B-1 | 20 | C-1 | 5 | D-1 | 10 | — |
| Ex. 2 | 65 | B-1 | 20 | C-2 | 5 | D-1 | 10 | — |
| Ex. 3 | 65 | B-1 | 25 | — | — | D-1 | 10 | — |
| Ex. 4 | 65 | B-1 | 20 | C-2 | 5 | D-1 | 10 | 0.3 |
| Ex. 5 | 65 | B-1 | 20 | C-2 | 5 | D-1 | 10 | 0.1 (F) |
| Ex. 6 | 55 | B-1 | 20 | C-2 | 5 | D-1 | 20 | — |
| Ex. 7 | 65 | B-1 | 20 | C-2 | 5 | D-3 | 10 | — |
| Ex. 8 | 65 | B-1 | 20 | C-2 | 5 | D-4 | 10 | — |
| Ex. 9 | 65 | B-1 | 25 | C-2 | 5 | D-1 | 5 | — |
| Ex. 10 | 65 | B-1 | 20 | C-2 | 5 | D-6 | 10 | — |
| Ex. 11 | 80 | B-1 | 5 | C-1 | 5 | D-1 | 10 | — |
| Ex. 12 | 55 | B-1 | 30 | C-1 | 5 | D-1 | 10 | — |
| Ex. 13 | 65 | B-1 | 23 | C-1 | 2 | D-1 | 10 | — |
| Ex. 14 | 55 | B-1 | 20 | C-1 | 15 | D-1 | 10 | — |
| Comp. Ex. 1 | 65 | B-1 | 20 | C-2 | 5 | D-5 | 10 | — |
| Comp. Ex. 2 | 65 | B-1 | 25 | — | — | D-5 | 10 | 0.2 |
| Comp. Ex. 3 | 65 | B-1 | 25 | — | — | D-5 | 10 | 0.1 (G) |
| Ex. 15 | 65 | B-2 | 20 | C-2 | 5 | D-2 | 10 | — |
| Ex. 16 | 65 | B-2 | 20 | C-2 | 5 | D-2 | 10 | 0.3 |
| Comp. Ex. 4 | 65 | B-2 | 20 | C-2 | 5 | D-5 | 10 | — |
| Comp. Ex. 5 | 65 | B-2 | 25 | — | — | D-5 | 10 | 0.2 |

TABLE 2

| | Physical Properties of Test Pieces | | | |
|---|---|---|---|---|
| Ex. or Comp. Ex. | Tensile Elongation at Break (%) | Flexural Modulus (MPa) | Izod Impact Strength (kJ/m$^2$) | Flow Value (pellets) ($\times 10^{-2}$ ml/sec) |
| Ex. 1 | 100 | 3,900 | 60 | 9.0 |
| Ex. 2 | 100 | 3,800 | 70 | 10.0 |
| Ex. 3 | 90 | 4,100 | 10 | 8.5 |
| Ex. 4 | 100 | 3,800 | 62 | 8.5 |
| Ex. 5 | 90 | 3,750 | 50 | 10.0 |
| Ex. 6 | 85 | 4,500 | 40 | 12.5 |
| Ex. 7 | 100 | 3,800 | 55 | 11.5 |
| Ex. 8 | 95 | 3,900 | 58 | 11.5 |
| Ex. 9 | 110 | 3,500 | 70 | 7.5 |
| Ex. 10 | 30 | 4,400 | 30 | 7.0 |
| Ex. 11 | 85 | 3,900 | 70 | 9.0 |
| Ex. 12 | 80 | 4,000 | 50 | 13.0 |
| Ex. 13 | 80 | 4,100 | 35 | 9.0 |
| Ex. 14 | 95 | 3,800 | 85 | 14.0 |
| Comp. Ex. 1 | 60 | 3,500 | 10 | 25.0 |
| Comp. Ex. 2 | 100 | 3,800 | 6 | 16.3 |
| Comp. Ex. 3 | 80 | 3,950 | 5 | 15.5 |
| Ex. 15 | 88 | 3,850 | 60 | 10.0 |
| Ex. 16 | 85 | 3,900 | 65 | 9.5 |
| Comp. Ex. 4 | 20 | 3,500 | 20 | 15.0 |
| Comp. Ex. 5 | 40 | 3,700 | 15 | 10.5 |

TABLE 2-continued

| Ex. or Comp. Ex. | Appearance | Working Stability | | Retention (%) |
| --- | --- | --- | --- | --- |
| | | Load (at initiation) (kg) | Load (after 20 min) (kg) | |
| Ex. 1 | ○ | 62 | 52 | 84 |
| Ex. 2 | ○ | 60 | 48 | 80 |
| Ex. 3 | ○ | 65 | 54 | 83 |
| Ex. 4 | ⊙ | 65 | 54 | 83 |
| Ex. 5 | ⊙ | 60 | 47 | 78 |
| Ex. 6 | ○ | 48 | 40 | 83 |
| Ex. 7 | ○ | 56 | 42 | 75 |
| Ex. 8 | ○ | 55 | 41 | 75 |
| Ex. 9 | ○ | 68 | 61 | 90 |
| Ex. 10 | ○ | 70 | 56 | 80 |
| Ex. 11 | ○ | 62 | 48 | 77 |
| Ex. 12 | ○ | 45 | 38 | 84 |
| Ex. 13 | ○ | 61 | 52 | 85 |
| Ex. 14 | ○ | 42 | 34 | 81 |
| Comp. Ex. 1 | X | 30 | 15 | 50 |
| Comp. Ex. 2 | ○ | 43 | 30 | 70 |
| Comp. Ex. 3 | ○ | 48 | 34 | 71 |
| Ex. 15 | ○ | 80 | 60 | 75 |
| Ex. 16 | ○ | 84 | 64 | 77 |
| Comp. Ex. 4 | X | 40 | 25 | 63 |
| Comp. Ex. 5 | ○ | 80 | 50 | 63 |

What is claimed is:

1. A polycarbonate resin composition which comprises 30 to 89% by weight of a polycarbonate resin (A), 5 to 25% by weight of pyethylene terephthalate resin (B), 5 to 50% by weight of a rubbery elastomer (C) and 1 to 30% by weight of a talc having an average particle diameter of 0.2–10 μm which is treated with an aminosilane coupling agent (D), wherein said polycarbonate resin (A) is a polymer containing a structural unit represented by the general formula (I)

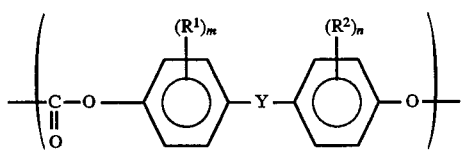

wherein $R^1$ and $R^2$ are each a hydrogen atom, a halogen atom or an alkyl group having 1 to 8 carbon atoms, and wherein said $R^1$ and $R^2$ are the same or different from each other, and when a plurality of $R^1$s are present, said $R^1$s may be the same or different, and when a plurality of $R^2$s are present, said $R^2$s may be the same or different; m and n are each an integer of 1 to 4; and Y is a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, —CO— or a bond represented by the formula (II) or (II'):

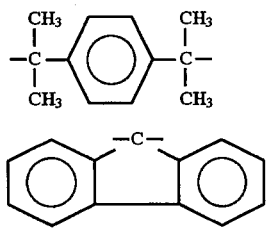

2. A polycarbonate resin composition obtained by blending 100 parts by weight of a mixture of 30 to 89% by weight of a polycarbonate resin (A), 5 to 25% by weight of polyethylene terephthalate resin (B), 5 to 50% by weight of a rubbery elastomer (C) and 1 to 30% by weight of a talc having an average particle diameter of 0.2 to 10 μm which is treated with an aminosilane coupling agent (D) with 0.01 to 5 parts by weight of a phosphite antioxidant (E), wherein said polycarbonate resin (A) is a polymer containing a structural unit represented by the general formula (I)

$$\left( -\overset{O}{\underset{\|}{C}}-O-\underset{(R^1)_m}{\bigcirc}-Y-\underset{(R^2)_n}{\bigcirc}-O- \right) \quad (I)$$

wherein $R^1$ and $R^2$ are each a hydrogen atom, a halogen atom or an alkyl group having 1 to 8 carbon atoms, and wherein said $R^1$ and $R^2$ are the same or different from each other, and when a plurality of $R^1$s are present, said $R^1$s may be the same or different, and when a plurality of $R^2$s are present, said $R^2$s may be the same or different; m and n are each an integer of 1 to 4; and Y is a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, —CO— or a bond represented by the formula (II) or (II').

3. A polycarbonate resin composition which comprises 30 to 89% by weight of a polycarbonate resin (A), 5 to 25% by weight of polybutylene terephthalate resin (B), 5 to 50% by weight of a rubbery elastomer (C) and 1 to 30% by weight of a talc having an average particle diameter of 0.2–10 μm which is treated with an epoxysilane coupling agent (D), wherein said polycarbonate resin (A) is a polymer containing a structural unit represented by the general formula (I)

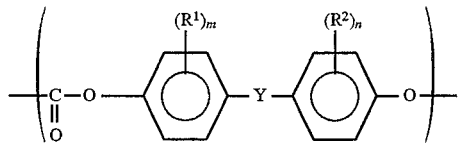

wherein $R^1$ and $R^2$ are each a hydrogen atom, a halogen atom or an alkyl group having 1 to 8 carbon atoms, and wherein said $R^1$ and $R^2$ are the same or different from each other, and when a plurality of $R^1$s are present, said $R^1$s may be the same or different, and when a plurality of $R^2$s are present, said $R^2$s may be the same or different; m and n are each an integer of 1 to 4; and Y is a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, —CO— or a bond represented by the formula (II) or (II'):

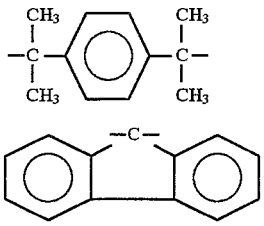

4. A polycarbonate resin composition obtained by blending 100 parts by weight of a mixture of 30 to 89% by weight of a polycarbonate resin (A), 5 to 25% by weight of polybutylene terephthalate resin (B), 5 to 50% by weight of a rubbery elastomer (C) and 1 to 30% by weight of a talc having an average particle diameter of 0.2 to 10 μm which is treated with an epoxysilane coupling agent (D) with 0.01 to 5 parts by weight of a phosphite antioxidant (E), wherein said polycarbonate resin (A) is a polymer containing a structural unit represented by the general formula (I)

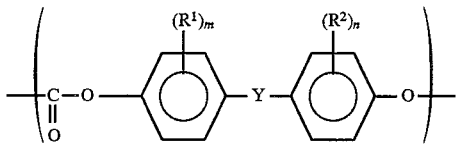

wherein $R^1$ and $R^2$ are each a hydrogen atom, a halogen atom or an alkyl group having 1 to 8 carbon atoms, and wherein said $R^1$ and $R^2$ are the same or different from each other, and when a plurality of $R^1$s are present, said $R^1$s may be the same or different, and when a plurality of $R^2$s are present, said $R^2$s may be the same or different; m and n are each an integer of 1 to 4; and Y is a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, —CO— or a bond represented by the formula (II) or (II'):

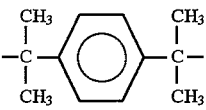

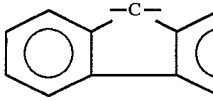

5. The polycarbonate resin composition according to claim 2, wherein the phosphite antioxidant (E) is a compound represented by the formula (V)

wherein $R^6$ is a hydrogen atom, an alkyl group having 1 to 20 carbon atoms, an aryl group having 6 to 20 carbon atoms, an alkylaryl group having 7 to 30 carbon atoms or an arylalkyl group having 7 to 30 carbon atoms, and wherein said $R^6$ may be substituted by a halogen atom, an alkylthio group having 1 to 30 carbon atoms or a hydroxyl group, said $R^6$s may be the same or different from each other, provided that said $R^6$s are not simultaneously hydrogen atoms, or a compound represented by the formula (VI)

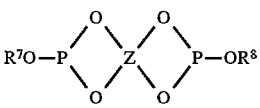

wherein $R^7$ and $R^8$ are each a hydrogen atom, an alkyl group having 1 to 20 carbon atoms, an aryl group having 6 to 20 carbon atoms, an alkylaryl group having 7 to 20 carbon atoms, or an arylalkyl group having 7 to 20 carbon atoms, and wherein said $R^7$ and $R^8$ may be substituted by a halogen atom, an alkylthio group having 1 to 30 carbon atoms or a hydroxyl group, said $R^7$ and $R^8$ may be the same or different from each other, provided that said $R^7$ and $R^8$ are not simultaneously hydrogen atoms; and Z is a tetravalent hydrocarbon residue having 1 to 20 carbon atoms which may contain an ether linkage.

6. An exterior automotive trim obtained by molding a polycarbonate resin composition described in claim 3.

7. The polycarbonate resin composition according to claim 1 wherein the polycarbonate resin (A) has a viscosity-average molecular weight of 10,000 to 100,000.

8. The polycarbonate resin composition according to claim 2 wherein the polycarbonate resin (A) has a viscosity-average molecular weight of 10,000 to 100,000.

9. The polycarbonate resin composition according to claim 1 wherein the rubbery elastomer (C) is a copolymer of one or more of an acrylic polymer or a methacrylic polymer comprising an alkyl acrylate or an alkyl methacrylate, a diene polymer comprising a conjugated diene selected from butadiene or isoprene, or a silicone polymer comprising a polyorganosiloxane.

10. The polycarbonate resin composition according to claim 2 wherein the rubbery elastomer (C) is a copolymer of one or more of an acrylic polymer or a methacrylic polymer comprising an alkyl acrylate or an alkyl methacrylate, a diene polymer comprising a conjugated diene selected from butadiene or isoprene, or a silicone polymer comprising a polyorganosiloxane.

11. The polycarbonate resin composition according to claim 2 wherein the phosphite antioxidant (E) is a compound represented by the formula (V)

$$(R^6O)_3P \quad (V)$$

wherein $R^6$ is a hydrogen atom, an alkyl group having 1 to 20 carbon atoms, an aryl group having 6 to 20 carbon atoms, an alkylaryl group having 7 to 30 carbon atoms or an arylalkyl group having 7 to 30 carbon atoms, and wherein said $R^6$ may be substituted by a halogen atom, an alkylthio group having 1 to 30 carbon atoms or a hydroxyl group, said $R^6$s may be the same or different from each other, provided that said $R^6$s are not simultaneously hydrogen atoms, or a compound represented by the formula (VI)

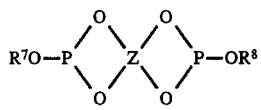

(VI)

wherein $R^7$ and $R^8$ are each a hydrogen atom, an alkyl group having 1 to 20 carbon atoms, an aryl group having 6 to 20 carbon atoms, an alkylaryl group having 7 to 20 carbon atoms, or an arylalkyl group having 7 to 20 carbon atoms, and wherein said $R^7$ and $R^8$ may be substituted by a halogen atom, an alkylthio group having 1 to 30 carbon atoms or a hydroxyl group, said $R^7$ and $R^8$ may be the same or different from each other, provided that said $R^7$ and $R^8$ are not simultaneously hydrogen atoms; and Z is a tetravalent hydrocarbon residue having 1 to 20 carbon atoms which may contain an ether linkage.

12. An exterior automotive trim obtained by molding a polycarbonate resin composition described in claim 1.

* * * * *